Patented Feb. 22, 1944

2,342,249

UNITED STATES PATENT OFFICE 2,342,249

CATALYST MANUFACTURE

Robert E. Burk, Cleveland Heights, Ohio, assignor to The Standard Oil Company, Cleveland, Ohio, a corporation of Ohio No Drawing. Application September 19, 1938, Serial No. 230,656

3 Claims. (Cl. 252—254)

In catalysts prepared by co-precipitation from dissolved salts of two or more elements, the general experience is that the activity of the catalyst is not as uniform or as well sustained as might be reasonably expected and as is desirable, and furthermore there may be considerable variation in successive batches of the same catalyst. I have found that this is a consequence of the conventional methods of manufacture. But, in accordance with the present invention, catalyst preparations may be had, which are thoroughly uniform in composition and which have activity of consistent and sustained character and a given catalyst may be reproduced without undesirable variation.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

If, as in accordance with the known and usual modes of procedure, a mixture such as for example the salts titanium chloride and chromium chloride or nitrate, be in solution, the solution mixture may be maintained only if the solution is rather strongly acid. On addition of a base, the titanium is first precipitated and then the chromium, and the precipitate so formed is found to be non-uniform, the relative amounts of titanium and of chromium varying greatly from the inside to the surface of the precipitated masses. This differential is found to exist in greater or less degree generally where two or more elements are co-precipitated, and even where the solubility properties of the desired various components would not indicate such effects so plainly, it is nevertheless there. Thus, when catalyst components are precipitated, the formation of respective nuclei of each is dependent upon various factors such as the speed of diffusion of ions of each, and the number of molecules of catalyst required to form a nucleus which is in turn related to such factors as surface tension; and if a catalyst which involves oxides of two metals in definite proportions and molecularly mixed is desired, this is not obtained by gross precipitation from a solution in which the components are present in the theoretical proportions. In proceeding in accordance with my invention, only a small amount of the soluble salts in solution are present in the precipitating or mixing zone at one time, and the precipitant is added at a rate slightly less than the amount of feed of the salt solution or which is in arrears, or providing a lag. With the precipitant so started in deficiency, unprecipitated catalyst ions are still in the field, and with the more easily precipitated component going down at a rate greater than the less easily precipitated component their relative concentrations change in adjustment to the point representing equilibrium for the proportions desired in the precipitate, and with the further feed of the catalyst salts in their proportions and the feed of the precipitant at a rate equivalent to the on-coming catalyst salts, the desired equilibrium proportion in the precipitate is maintained. Thus, in mixing a precipitant with the dissolved salts, a particularly desirable procedure is to start the introduction of the dissolved salts into a mixing zone, and when a small body of such liquid has accumulated the introduction of the precipitant is started, and this in such condition occasions a beginning precipitation during which concentration adjustment of each component is attained so that on the continuing introduction of all of the reacting components in proper proportions, the adjustment of concentrations will continue, established at an equilibrium which corresponds to the formation of a precipitate with the components in the desired proportion, uniformly and molecularly mixed.

Otherwise, it would be necessary, where starting both the precipitant and the salt solution feeds at the same time, to accurately control the feed of less precipitant for a while, then adjust the feed of precipitant to the in-coming feed of salt solution, a routine which while feasible is not quite so generally convenient as that first-mentioned. This procedure is outstandingly useful in producing catalysts on large scale, being convenient and also positive in uniformity of results.

As an example: Nitrates of aluminum and chromium are dissolved in distilled water at the rate for instance of 2500 and 713 grams respectively, based on anhydrous salts, per each 18.8 liters of water, the solution is warmed to about 55° C., and pumping thereof is started into a mixing chamber having suitable agitation, the pumping preferably being effected in a non-pulsating type of supply stream. Shortly after starting the flow of dissolved salts, the pumping in or running in of ammonium hydroxide to which $SnCl_4$ has been added (78.2 gms. to 2500 of $Al(NO_3)_3$ used) is started, for instance concentrated ammonium hydroxide 2310 grams and ammonium acetate 1500 grams per 11.2 liters of distilled water. The supplying of the components, thus with a lag of the precipitant, is continued, and with apparatus involving suitable arrangements for continuous relative feeds and passing on to suitable settling zones, a continuous type of catalyst production may be had. The precipitate is washed thoroughly in water and is filtered, and is dried for instance at about 140° F. and under vacuum at about 400° F.

As another example: Antimony chloride and aluminum nitrate and chromium nitrate at the rate of 68.4, 2500 and 713 grams respectively and enough free acid to keep the antimony dissolved, per 18.8 liters of distilled water, being brought into solution, and the solution being warmed, pumping or flow into an agitating mixing zone is started. And in sequence pumping in or flow of a precipitant, ammonium hydroxide for instance at the rate of 2310 grams concentrated ammonium hydroxide and 1500 grams of ammonium acetate per 11.2 liters of distilled water is started, and the ultimate precipitate is separated and washed and dried as foregoing.

As another example: Beryllium nitrate at the rate for instance of 0.01 mol, and ammonium acetate 40 grams per 1.6 liters of water, and chromium nitrate at the rate of for instance 0.2 mol in 0.7 liter of water are provided, and the mixture is heated to 40-60° C. and flow to an agitating mixing zone is started. Then flow of a precipitant, for instance ammonium hydroxide as at the rate of 65 grams concentrated ammonium hydroxide per 0.8 liter of water, is started. The precipitate formed by the supplying of the components is separated and washed and dried.

As another example: Ethyl silicate and a solution of $Cr(NO_3)_3$ are brought into homogeneous solution by adding alcohol. Proportions may be 4 mols $SiO_2$ to 6 of $Cr_2O_3$. This is pumped into a reaction zone where the same volume is maintained and where $NH_4OH$ containing alcohol sufficient to prevent separation of liquid unhydrolyzed ethyl silicate is added. The $NH_4OH$ is in insufficient amount to cause complete precipitation. The remaining solution is returned at a high rate to a pre-mixing zone where the fresh feed is admixed. The resulting mixture in which the chromium content never rises above a trace is returned to the precipitation zone.

It is usually desirable to siphon off solution from the precipitating zone to prevent the volume from building up too high.

As another example: Chromium nitrate and aluminum nitrate and ammonium acetate at the rate for instance of 713, 2500 and 1770 grams respectively per 18.8 liters of distilled water, being dissolved and the solution warmed to about 55° C., pumping thereof is started into a mixing zone. Then pumping of a precipitant, ammonium hydroxide at the rate for instance of 91 grams concentrated ammonia per 2 liters of water, is started. The precipitate is separated, washed and dried.

The supplying of the liquids to the mixing zone may be by pumping or pressure or gravity flow, conveniently, and as indicated, in some instances a component may be included in the precipitant feed. Where the components are compatible they may be brought in a stream together into the mixing zone or they can be brought in as separate streams, but where they are incompatible a separate stream may be employed for each. As the feed streams must be mixed in the mixing zone and compensation reached before precipitation occurs, in instances such as with antimony, titanium and the like where precipitation would occur too quick, it is advantageous to recycle a rather large volume of liquid from the mixing zone back into the fresh feed stream of the components which are to be precipitated. Advantageously, in a mixing zone a constant level of body of liquid may be maintained by siphoning or overflow.

As seen, in such co-precipitation, various components can be combined, and the proportions of the components may be as desired in any given instance, this process giving in all instances a condition of precipitation in which initially the precipitant is in slightly deficient relative supply and adjustment to equilibrium thereon occurs, and the supply of the components is then continued, the ions being provided as required. Such catalysts as of the oxide and sulphide type, involving for instance elements from the first second, third, fourth, fifth and sixth groups of the periodic system excepting usually alkali metal, alkaline earth metals, scandium, yttrium, lanthanum, carbon, selenium, tellurium, polonium, nitrogen and phosphorus, are thus prepared with particularly efficacy and uniformity and stability.

Other modes of applying the principle of the invention may be employed, change being made as regards the details described, provided the features stated in any of the following claims, or the equivalent of such, be employed.

I therefore particularly point out and distinctly claim as my invention:

1. In a process for preparing gel type plural oxide catalysts of definite composition wherein hydrous gel type plural oxides are precipitated by means of a precipitant from a solution containing soluble ingredients in a mixing zone which ingredients form said hydrous oxides upon treatment with said precipitant, the improvement which comprises maintaining flowing streams of a solution of ethyl silicate and chromium nitrate and an ammonium hydroxide solution into the mixing zone, said ingredients being so proportioned relative to one another as to yield a product of hydrous gel type plural oxides of the desired final composition if treated with sufficient ammonium hydroxide for complete precipitation, and the ammonium hydroxide being introduced at a rate such that enough in any given time is introduced to completely precipitate all ingredients introduced during the same period of time, but commencing the introduction of the ammonium hydroxide to the mixing zone after the flow of the ingredient solution has started, and recycling liquid from the mixing zone in addition to the fresh ethyl silicate and chromium nitrate solution stream.

2. In a process for preparing gel type plural oxide catalysts of definite composition wherein hydrous gel type plural oxides are precipitated by means of a precipitant from a solution containing soluble ingredients in a mixing zone which ingredients form said hydrous oxides upon treatment with said precipitant, the improvement which comprises maintaining flowing streams of a solution of ethyl silicate and chromium nitrate and an ammonium hydroxide solution into the mixing zone, said ingredients being so proportioned relative to one another as to produce a product of hydrous gel type plural oxides of the desired final composition if treated with sufficient ammonium hydroxide for complete precipitation, and the ammonium hydroxide being introduced at a rate such that enough precipitant in any given time is introduced to completely precipitate all ingredients introduced during the same period of time, but commencing the precipitating without enough precipitant to precipitate all of the catalyst ingredients then in the mixing zone.

3. A process for producing catalysts which comprises mixing a solution of an organic silicon compound with a solution of a chromium salt, coprecipitating silica gel and an oxide gel of chromium from the mixed solutions, and recovering the resultant composite gel.

ROBERT E. BURK.